(12) United States Patent
Madhav et al.

(10) Patent No.: US 12,167,290 B2
(45) Date of Patent: Dec. 10, 2024

(54) METHOD AND APPARATUS FOR ENABLING OFFLOADING NETWORK TRAFFIC VIA A CONNECTED CELLULAR DEVICE

(71) Applicant: ViaSat, Inc., Carlsbad, CA (US)

(72) Inventors: Praveen Madhav, Carlsbad, CA (US); Pawan Uberoy, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 291 days.

(21) Appl. No.: 17/700,244

(22) Filed: Mar. 21, 2022

(65) Prior Publication Data
US 2022/0217605 A1     Jul. 7, 2022

Related U.S. Application Data

(63) Continuation of application No. PCT/US2019/053439, filed on Sep. 27, 2019.

(51) Int. Cl.
H04W 36/22     (2009.01)

(52) U.S. Cl.
CPC .................................. H04W 36/22 (2013.01)

(58) Field of Classification Search
None
See application file for complete search history.

(56) References Cited

U.S. PATENT DOCUMENTS

| | | |
|---|---|---|
| 6,862,622 B2 | 3/2005 | Jorgensen |
| 8,155,158 B2 | 4/2012 | Saavedra |
| 8,432,871 B1 | 4/2013 | Sarnaik et al. |
| 8,559,340 B2 | 10/2013 | Verma et al. |
| 8,630,192 B2 | 1/2014 | Raleigh |
| 8,635,335 B2 | 1/2014 | Raleigh et al. |
| 9,055,106 B2 | 1/2015 | Tsui et al. |
| 8,953,441 B2 | 2/2015 | Nakil et al. |
| 9,860,290 B2 * | 1/2018 | Oyman ............... H04L 63/0815 |

(Continued)

FOREIGN PATENT DOCUMENTS

WO     2006111809 A1     10/2006

OTHER PUBLICATIONS

Cellular Traffic Offloading onto Network-Assisted Device-to-Device Connections, IEEE Communications Magazine, Apr. 2014.

(Continued)

*Primary Examiner* — Lonnie V Sweet
(74) *Attorney, Agent, or Firm* — Chang & Hale LLP

(57) ABSTRACT

A process and/or apparatus capable of providing alternative communication channels for facilitating network communication is disclosed. The process, in some embodiments, maintains a primary link which facilitates network communication between various attached devices and content providers. After identifying a cellular and wireless capable ("CWC") device, a hybrid function of the CWC device is activated for providing one or more overlay channels between through the CWC device creating a secondary link for communications between the various attached devices and content providers. The process is then capable of offloading network traffic between the primary link and the secondary link, for example, based on the types of the network traffic.

18 Claims, 11 Drawing Sheets

(56) References Cited

U.S. PATENT DOCUMENTS

| | | | | |
|---|---|---|---|---|
| 2008/0304458 | A1* | 12/2008 | Aghvami | H04L 69/08 |
| | | | | 370/338 |
| 2014/0269464 | A1* | 9/2014 | Park | H04W 48/08 |
| | | | | 370/328 |
| 2014/0341109 | A1 | 11/2014 | Cartmell et al. | |
| 2016/0112495 | A1 | 4/2016 | Gizis et al. | |
| 2016/0330108 | A1* | 11/2016 | Gillon | H04L 45/22 |
| 2017/0135147 | A1* | 5/2017 | Belghoul | H04W 76/36 |
| 2017/0195208 | A1 | 7/2017 | Kissel | |
| 2017/0245211 | A1* | 8/2017 | Patil | H04W 8/005 |
| 2017/0250950 | A1 | 8/2017 | Gizis et al. | |
| 2017/0272273 | A1 | 9/2017 | Singla et al. | |
| 2017/0294957 | A1 | 10/2017 | Ravishankar et al. | |
| 2023/0199886 | A1* | 6/2023 | Wang | H04W 76/16 |
| | | | | 370/329 |

OTHER PUBLICATIONS

A Cellular Bonding and Adaptive Load Balancing Based Multi-SIM Gateway for Mobile AD HOC and Sensor Networks, International Journal on AdHoc Networking Systems (IJANS) vol. 5, No. 3, Jul. 2015.

New from iDirect: a Software Defined, VSAT-LTE Hybrid Modem, Satellite Mobility World Apr. 2019.

Mobile Data Offloading Techniques and Related Issues, Pawar et al., International Journal of Advanced Research in Computer Engineering & Technology (IJARCET), vol. 4 issue 4, Apr. 2015.

SDN-enabled Tactical Ad Hoc Networks: Extending Programmable Control to the Edge, Poularakis et al., arXiv:1801.02909v1 [cs.NI] Jan. 9, 2018.

PCT International Search Report, PCT/US2019/053439.

* cited by examiner

METHOD AND APPARATUS FOR ENABLING OFFLOADING NETWORK TRAFFIC VIA A CONNECTED CELLULAR DEVICE

PRIORITY

This application claims the benefit of priority based upon the PCT Application Ser. No. PCT/US2019/053439, filed on Sep. 27, 2019, entitled "Method and Apparatus for Enabling Offloading Network Traffic via A Connected Cellular Device", the disclosure of which is hereby incorporated into the present application by reference in its entirety.

FIELD

The exemplary embodiment(s) of the present invention relates to communication networks. More specifically, the disclosed embodiment(s) of the present application relates to offloading network traffic between various network communication channels.

BACKGROUND

With increasing popularity of electronic devices, such as computers, smart phones, mobile devices, server farms, mainframe computers, and the like, the demand for more and faster digital information is constantly growing. To handle and facilitate voluminous digital data between end users and content providers, high-speed and high-capacity computer networks are typically used. A conventional approach to provide a high-speed and high-capacity computer network is to use a sophisticated telecom infrastructure such as multiple hardware physical channels and additional network devices to increase transmission bandwidth. A drawback, however, for a traditional method of secondary line is that building a physical cable, line, and/or connection requires additional resources which can often be difficult and expensive. Embodiments of the present invention address the foregoing and/or problems in the prior art.

SUMMARY

Some embodiments disclose a process of enhancing network performance by establishing one or more alternative communication channels using overlay networks and wireless client(s) for network routing. For example, a network routing element, such as a home unit or modem, maintains a primary link and a secondary link for facilitating network communication between various attached devices and remote content providers. The network routing element is able to identify a cellular and wireless capable ("CWC") device (e.g., a smart phone or a cellular phone) containing a hybrid module capable of facilitating a hybrid function of being a wireless client. The hybrid function, for example, is able to activate a secondary link via an overlay channel between a cellular transceiver of the CWC device and a wireless transceiver of the CWC device. Upon establishing a secondary link, the network traffic can be transmitted or offloaded between the primary link and the secondary link based on a variety of criteria such as the type of traffic as well as condition of the network.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
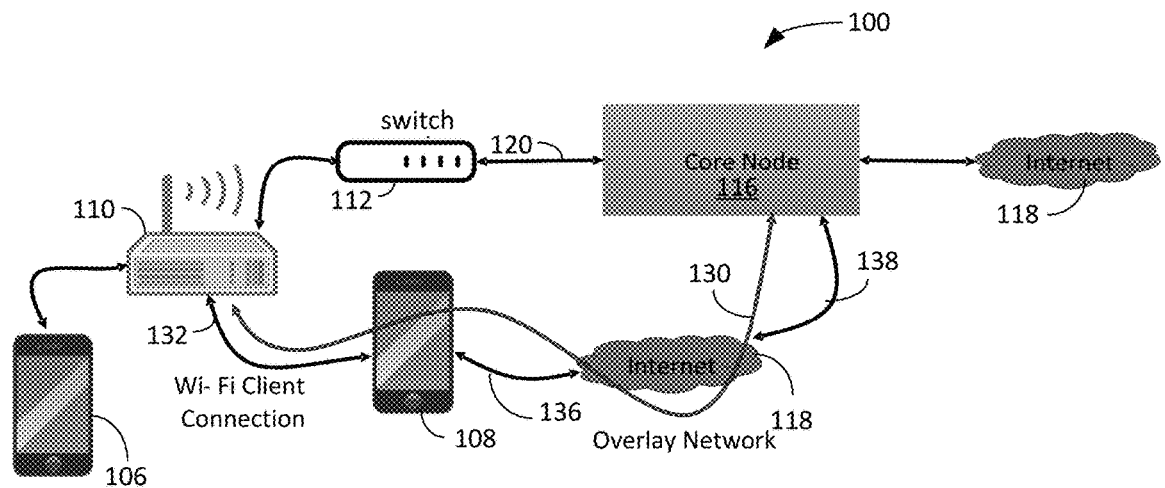
FIGS. 1A-1B are block diagrams illustrating an exemplary system containing alternative links using one or more overlay networks in accordance with some embodiments of the present invention.

Exemplary embodiment(s) of the present invention is described herein in the context of a method, device, and apparatus for providing network communication using alternative transmission channels via one or more overlay networks.

Those of ordinary skill in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skill in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

The following exemplary terms may be used to refer to a network for the illustrative purposes. The terms, however, should not be taken to limit the invention to any one or more embodiments, but are for explanation and understanding only relating to a network. IP communication network, IP network, or communication network, for example, can mean any type of network having an access network able to transmit data in the form of packets or cells, such as ATM (Asynchronous Transfer Mode) type, on a transport medium, for example, the TCP/IP or UDP/IP type. ATM cells, for instance, are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), 5G, or DVB-H (Digital Video Broadcasting-Handhelds)), or a hybrid (satellite and terrestrial) network.

Some embodiments of the presently invention disclose a process of enhancing network performance by establishing one or more alternative communication channels using overlay networks and wireless client(s) for network routing. For example, a network routing element, such as a home unit or modem, maintains a primary link and a secondary link for facilitating network communication between various attached devices and remote content providers. The network routing element is able to identify a cellular and wireless capable ("CWC") device (e.g., a smart phone or a cellular phone) containing a hybrid module capable of facilitating a hybrid function of being a wireless client. The hybrid function, for example, is able to activate a secondary link via an overlay channel between a cellular transceiver of the CWC device and a wireless transceiver of the CWC device. Upon establishing a secondary link, the network traffic can be transmitted or offloaded between the primary link and the secondary link based on the type of traffic as well as condition of the network.

FIG. 1A is a block diagram 100 illustrating an exemplary networking system containing alternative links using one or more overlay networks in accordance with some embodiments of the present invention. Diagram 100 includes a network routing device 110, a core node 116, a telecommunications network such as Internet 118, two cellular and wireless capable ("CWC") devices 106-108. CWC devices 106-108, in some embodiments, can be cellular phones, smart phones, portable phones, tablets, autonomous vehicles, cars, laptops, desktops, watches, and/or a combination of cellular phone, smart phone, portable phone, tablet, car, laptop, and/or desktop that has a cellular capability. In one aspect, network routing device 110 communicates with core node 116 via a primary link 120 and/or a secondary link 130 via a wireless client. It should be noted that the underlying concept of the exemplary embodiment(s) of the present invention would not change if one or more blocks (or devices) were added to or removed from diagram 100.

A cellular network, also known as a mobile network, is a communications network including wired and/or wireless communication network(s). For example, the last link of a cellular network usually is wireless connection via various cell towers and/or base stations. The cellular network generates, broadcasts, or distributes radio signals across a designated geographic area wherein the geographic area is generally divided into cells. Each cell of a cellular network serves one or more transceivers. It should be noted that a cell may use a different set of frequencies from neighboring cells for minimizing noise and/or cross interferences.

Wi-Fi is a wireless technology using radio wavelengths facilitating signal transmission within the wireless local area networking (WLAN) environment which is standardized in accordance with the IEEE 802.11 standards. A Wi-Fi client is a device connected to a Wi-Fi (wireless) network wherein the client is capable of transmitting and receiving wireless data or network traffic. A node is generally an actual physical computer, server, or a cluster of computers and/or servers capable of processing and distributing network traffics.

A function of the network system is to provide one or more alternative communication links, connections, or channels for facilitating network communication. The system includes primary link 120 and secondary link 130 wherein secondary link 130 is facilitated by CWC device or cellular device 108. In one example, CWC device 108 can be a cellular phone, smart phone, portable phone, tablet, car, laptop, and/or desktop that has a cellular capability. To simplify forgoing discussion, the terms "CWC device," "cellular device," "cellular phone," "smart phone," and "portable phone" are referring to the same or similar devices and they can be used interchangeably.

Primary link 120 includes a primary link switch or switch 112 and core node 116. In one aspect, one end of primary link is coupled to network routing device 110 or a home unit while the second end of primary link 120 is coupled to core node 116. Primary link switch 112 manages and facilitates network communication between a primary link interface of a network device such as network routing device 110 and a node such as core node 116. In some embodiments, primary link 120 includes a satellite-based communication network and/or a landline-based network. Thus, for example, primary link 120 can comprise one or more satellites and/or terrestrial components. Core node 116 includes a communication network overlay module or hybrid module operable to facilitate the secondary link.

Network routing device 110, in some embodiments, is a router, switch, hub, home unit, set-top box, gaming console, and/or modem that contains a routing controller and an overlay module. The routing controller, not shown in FIG. 1A, manages and/or routes network traffic through network routing device 110. For example, the routing controller is able to provide load balance between the links such as between primary link 120 and secondary link 130. The overlay module, not shown in FIG. 1A, is capable of facilitating and maintaining additional link(s) including facilitating to setup connections between network device 110 and the wireless transceiver of smart phone 108. In one aspect, the routing controller facilitates offloading network traffic from primary link 120 to secondary link 130 based on criteria such as the nature of the data, application, as well as network conditions.

CWC device or smart phone 106 or 108 can be a cellular phone, wireless phone, iPhone, portable phone, laptop computer, tablet, set-top box or the like. It should be noted that CWC device or smart phone 106 or 108 is capable of handling both cellular communication as well as wireless communication. In one aspect, a function of CWC device 108 which includes a wireless transceiver, cellular transceiver, and hybrid module is to act as a wireless client. For example, a wireless client is a WiFi client.

Secondary link 130 includes a wireless connection 132, smart phone 108, cellular connection 136, and network connection 138. In one aspect, smart phone 108 is able to facilitate establishing a secondary link including a connection or overlay connection between the wireless transceiver and the cellular transceiver of the smart phone for data transmission between wireless connection 132 and cellular connection 136. In some embodiments, secondary link 130 includes one or more overlay networks via cell towers for data transmission. It should be noted that secondary link 136 may include wireless as well as landline connections. Primary link 120 and secondary link 130 are coupled to Internet 118. In one exemplary embodiment, wireless connection 132 is a WiFi connection and wireless transceiver is a WiFi transceiver.

A function of cellular device 108 which connects to network device 110 via Wi-Fi 132 is to setup an overlay network (not shown in FIG. 1A) between wireless connection 132 and cellular connection 136 for network traffic offloading between the primary link and the secondary link. An advantage of using an overlay network is that the cellular device is used as a Wi-Fi client for offloading network traffic.

Figure 1B:
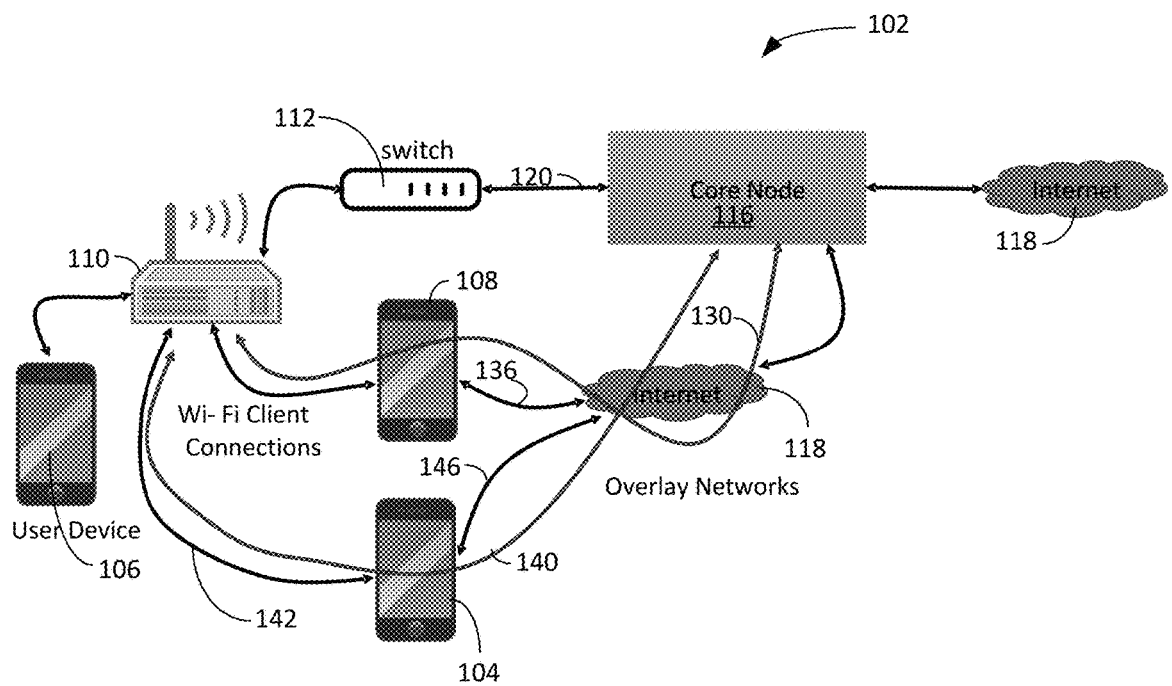

FIG. 1B is a block diagram 102 illustrating a network system containing multiple alternative links using overlay networks in accordance with some embodiments of the present invention. Diagram 102 includes network routing device 110, core node 116, Internet 118, three cellular devices 104-108. In one aspect, network routing device 110 communicates with core node 116 via a primary link 120 and/or an alternative links such as secondary link 130 via a wireless client. It should be noted that the underlying concept of the exemplary embodiment(s) of the present invention would not change if one or more blocks (or devices) were added to or removed from diagram 102.

Diagram 102 is similar to diagram 100 shown in FIG. 1A except that diagram 102 illustrates a third link 140 using cellular device 104 as a wireless client. For instance, third link 140 capable of transmitting information includes a wireless connection 142 and a cellular connection 146 via an overlay channel inside of cellular device 104.

An advantage of establishing multiple links via multiple cellular devices is to increase flexibility of transmission bandwidth via multiple overlay networks.

Figure 2A:
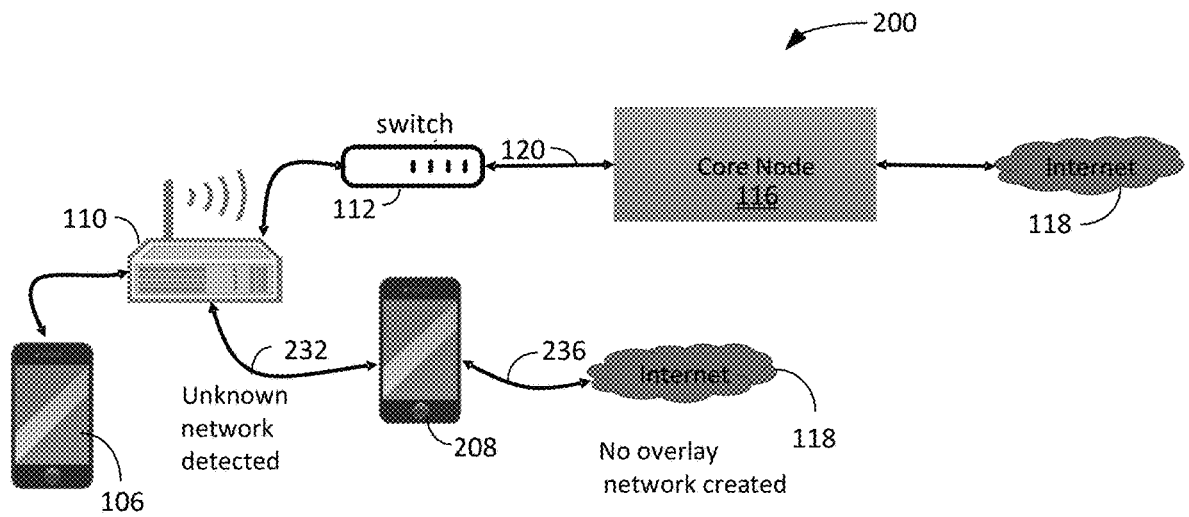
FIGS. 2A-2B are block diagrams illustrating a process of establishing an alternative link using a cellular device as a wireless client in accordance with some embodiments of the present invention.

FIG. 2A is a block diagram 200 illustrating a process of monitoring and detecting a potential wireless client for an alternative link in accordance with some embodiments of the present invention. Diagram 200 includes routing device 110, core node 116, Internet 118, cellular devices 106 and 208. In one aspect, routing device 110 communicates with core node 116 via a primary link 120. It should be noted that the underlying concept of the exemplary embodiment(s) of the present invention would not change if one or more blocks (or devices) were added to or removed from diagram 200.

Diagram 200 is similar to diagram 100 shown in FIG. 1A except that diagram 200 illustrates a scenario before a secondary link is established or built. In some embodiments, routing device 110 includes a hybrid module or hybrid application ("App") configured to monitor and detect nearby potential candidates for wireless clients. For example, routing device 110 monitors and/or detects a wireless client candidate as cellular device 208 entering the vicinity of routing device 110. Upon detecting cellular device 208 which contains a hybrid module capable of being a wireless client, routing device 110 identifies and verifies physical or potential connections 232-236 as well as Internet 118 for potentially establishing an alternative link for handling network traffic. It should be noted that vicinity of routing device 110 refers to a geographic area surrounding routing device 110 that has the wireless coverage from routing device 110.

Depending on the applications, routing device 110, in some embodiments, is continuously monitoring and identifying potential wireless clients within the vicinity of routing device 110 for alternative links. It should be noted that wireless clients such as cellular phones can move in and out of the nearby or vicinity area of routing device 110 continuously. To maintain a scenario of multiple links within a network system, links or channels for network communication are continuously established as well as torn down.

A function of the hybrid module is to automatically detect cellular devices connecting to a known network. In one aspect, a detection of a potential wireless client can trigger a process of setting up an alternative or secondary link using overlay network(s) with minimal user involvement.

An advantage of using a wireless client is that multiple number of cellular devices or phones can be in and out of the vicinity area or zone all the time. Links are constantly terminated as well as created.

Figure 2B:
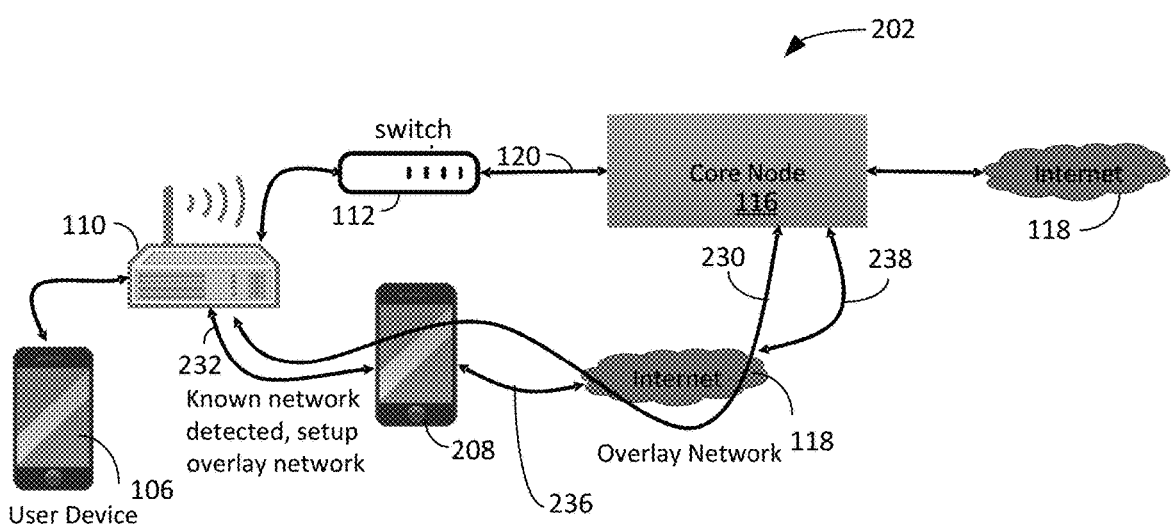

FIG. 2B is a block diagram 202 illustrating a process of establishing an alternative link using a cellular device as a wireless client in accordance with some embodiments of the present invention. Diagram 202 includes a routing device 110, core node 116, Internet 118, cellular devices 106 and 208. In one aspect, routing device 110 communicates with core node 116 via a primary link 120 and/or a secondary link 130 via a wireless client. It should be noted that the underlying concept of the exemplary embodiment(s) of the present invention would not change if one or more blocks (or devices) were added to or removed from diagram 200.

Diagram 202 is similar to diagram 200 shown in FIG. 2A except that diagram 202 illustrates a scenario that follows the scenario presented in diagram 200. After identifying cellular phone 208 is a wireless client candidate as shown in diagram 200 in FIG. 2A, a new link or secondary link 230 is established using an overlay network via wireless link 232, cellular phone 208 as the wireless client, cellular link 236, and Internet 118. Secondary link 230 can be used to offload network traffics from primary link 120.

Figure 3:
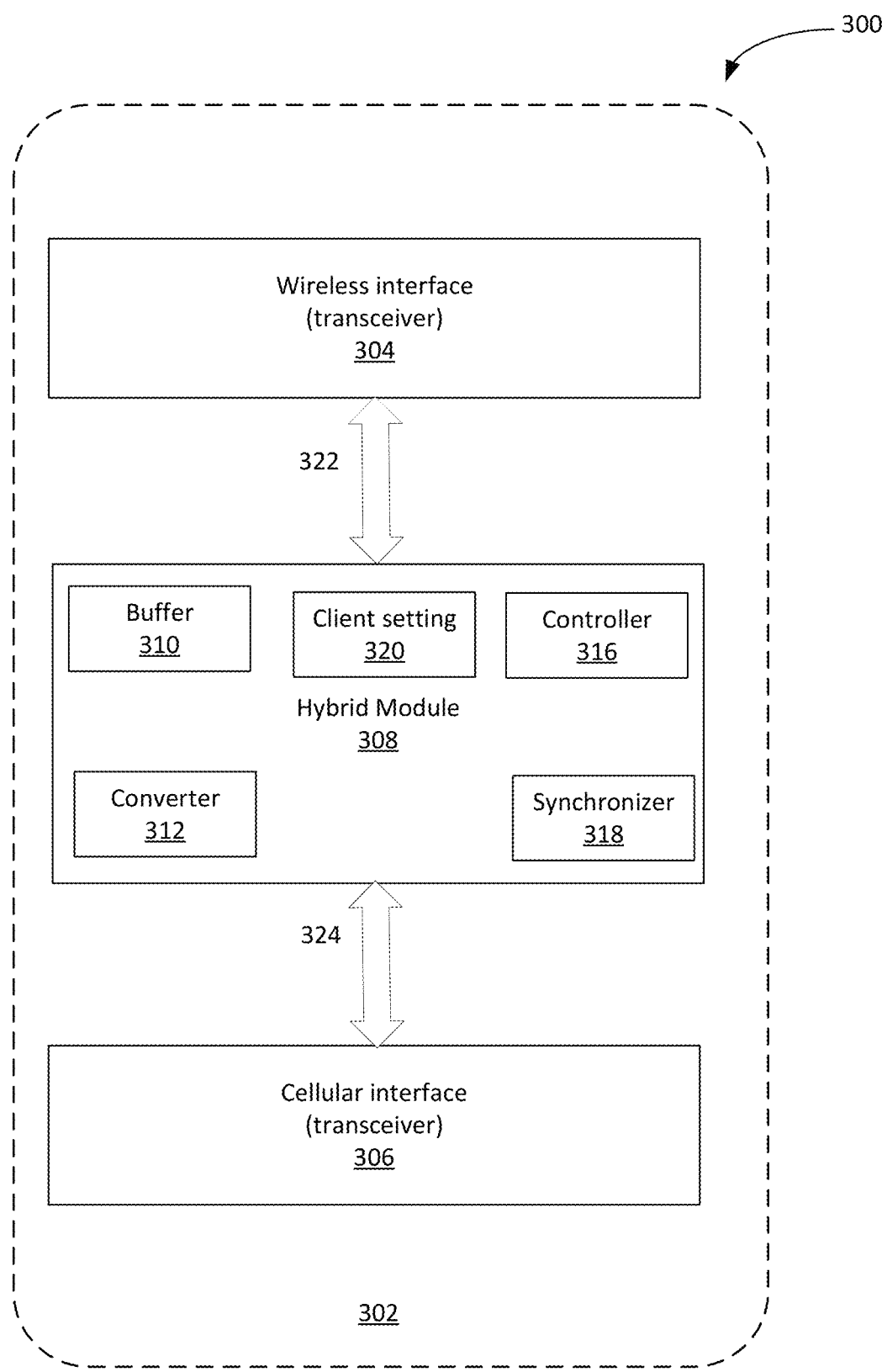
FIG. 3 is a block diagram illustrating a cellular device containing a hybrid module capable of being configured as a wireless client in accordance with some embodiments of the present invention.

FIG. 3 is a block diagram 300 illustrating a cellular device 302 containing a hybrid module 308 capable of configuring the cellular device as a wireless client in accordance with some embodiments of the present invention. Diagram 300 includes a wireless interface or transceiver 304 (e.g., a WiFi transceiver), hybrid module 308, and cellular interface or transceiver 306. In one aspect, wireless interface 304 and cellular interface 306 are coupled to hybrid module 308 using buses 322-324. It should be noted that the underlying concept of the exemplary embodiment(s) of the present invention would not change if one or more blocks (or devices) were added to or removed from diagram 300.

Wireless interface 304 is a wireless transceiver capable of transmitting or receiving wireless data to or from a wireless network. Cellular interface 306 is a cellular transceiver capable of transmitting or receiving cellular data to or from a cellular network. A function of hybrid module 308 is to facilitate seamless data transfer between wireless interface 304 and cellular interface 306.

Hybrid module 308, in some embodiments, includes a buffer 310, converter 312, controller 316, synchronizer 318, and client setting 320. Buffer 310 is used for buffering data between wireless transceiver and cellular transceiver. In some embodiments, converter 312 may be used to convert data packets and/or protocols (e.g., between wireless data and cellular data). Controller 316 manages various hybrid functions, such as potential wireless client detection or monitoring, establishing new link(s), tearing down existing link(s), buffer capacity, conversion sequence, transmission sequence, data characteristics, and the like. Synchronizer 318, in some embodiments, is used to synchronize packets between the primary link and the second link. Client setting 320 is used to set up a new link based on the availability of wireless clients.

During an operation, a process of hybrid module capable of providing alternative communication channels establishes a wireless connection between an overlay module of a home unit and a wireless transceiver of a cellular phone. After setting the cellular phone as a wireless client and building a transmission tunnel between wireless transceiver 304 of cellular phone 302 and cellular transceiver 306 of cellular phone 302, the network traffic can be transported via the transmission tunnel. Upon creating a cellular connection between cellular transceiver 306 of cellular phone 302 to a cell tower or base station, an overlay network is provided as part of a secondary link between the home unit and a core node. It should be noted that while maintaining the primary link, the network traffic can be offloaded between the primary link and the secondary link.

An advantage of having a secondary link using cellular network is to provide time sensitive data while the primary link is used to handle volume data such as movie and/or backup data.

Figure 4:
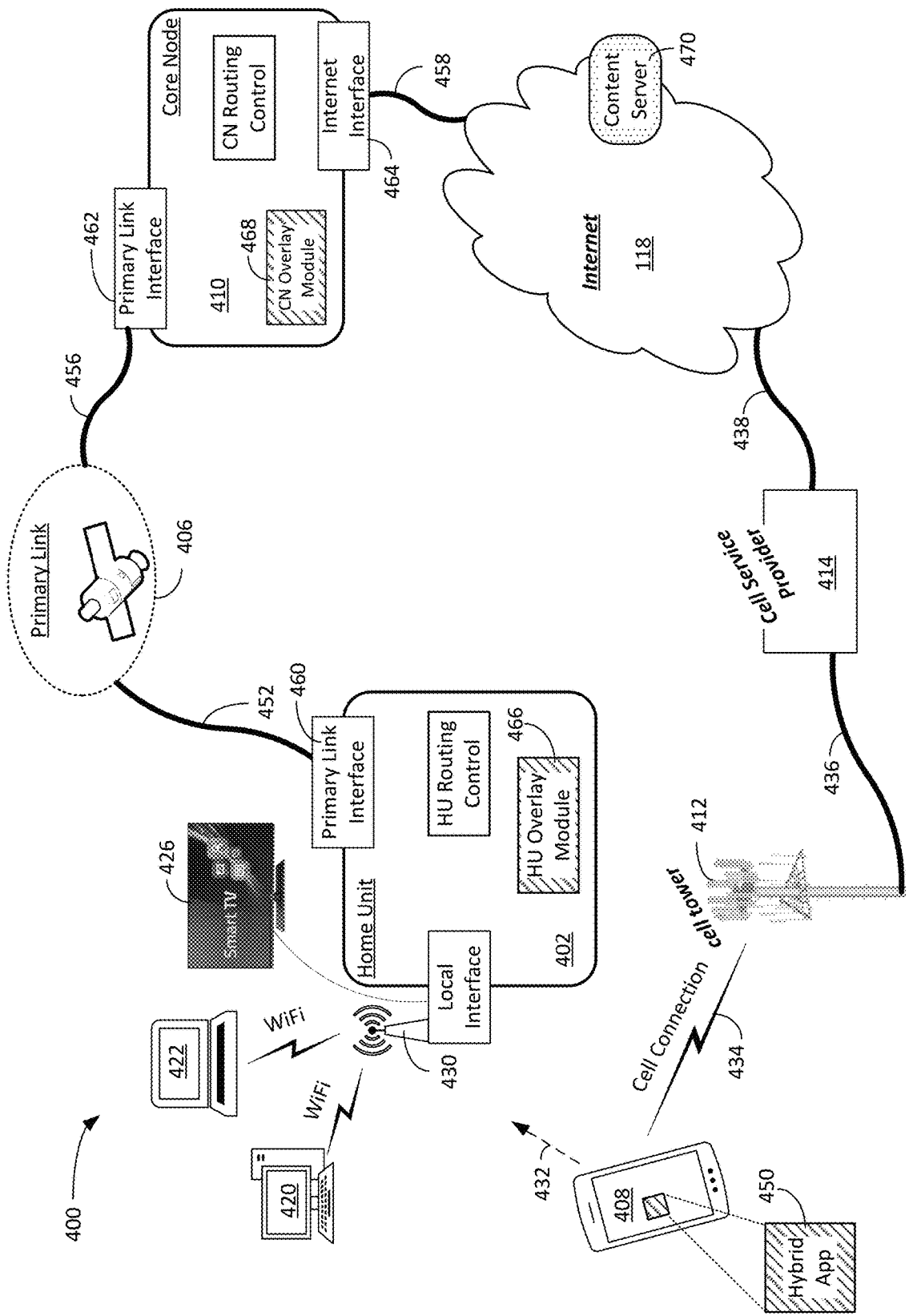
FIGS. 4-5 are block diagrams illustrating an exemplary process of creating a secondary link using an overlay network via a cellular device in accordance with some embodiments of the present invention.

FIG. 4 is a block diagram 400 illustrating an exemplary network system capable of creating a secondary link using an overlay network in accordance with some embodiments of the present invention. Diagram 400 includes a home unit 402, cellular device 408, core node 410, Internet 118, and cell tower 412. Home unit 402, which can be or comprise a modem, router, switch, and/or hub, includes a primary link interface 460, HU routing control, home unit ("HU") overlay module 466, and local or wireless interface 430. It should be noted that the underlying concept of the exemplary embodiment(s) of the present invention would not change if one or more blocks (or devices) were added to or removed from diagram 400. For example, although identified as the Internet, element 118 can comprise other or additional networks such as one or more private networks.

Cellular device 408, which can be a wireless and cellular capable device, includes a hybrid app 450 able to communicate with local interface 430 via wireless connection 432 and cell tower 412 via a cell connection 434. Cellular device 408 can be any type of cellular capable device such as a smart phone such as, but not limited to, iPhone®, Samsung Galaxy® phones, Android® phones, and the like. Cellular device 408 can alternatively be another type of cellular device such as a tablet, laptop computer, game console, or the like. Upon installing of hybrid app 450, the cellular device 408 can be used as a wireless client.

In a cell operation, cellular device 408 is able to access information on the Internet 118 or other communications network via cell tower 412 through cell connection 434 and cell service provider 414. In one example, cell service provider 414 facilities communication between cellular device 408 and Internet 118 via connections 436-438. HU 402 which is coupled to multiple user devices 420-426 via local interface 430 is able to access information in content server 470 via the primary link and core node 410. Although shown as WiFi connections, one or more of user devices 420-426 can be connected to the local interface 430 of the HU 402 by other types of connections including wired connections. Similarly, cellular device 408 can alternatively be connected to the local interface 430 by a WiFi connection (as shown in FIGS. 5-9) or other types of connections including a wired connection.

In some embodiments, the core node 410 can be an internet service provider (ISP). Content server 470, in one example, may include or host one or more content providers which, for example, provide film, video, audio, music, and/or any other online entertainment. Alternatively, the content provider may also be an online interactive gaming provider. In addition, the content provider may provide a real-time interactive conference call. As yet another example, content provider may host Web sites and thus provide Web pages.

Core node 410 includes a core node ("CN") overlay module 468, CN routing control, primary link interface 462, and internet interface 464. While Internet interface 464 is coupled to Internet 118 via connection 458, CN 410 is also coupled to the primary link via connection 456 through primary link interface 462. In one aspect, the primary link includes a satellite communication network 406. In some embodiments, the primary link includes connection 452, satellite communication network 406, and connection 456. A satellite link is merely an example, however, and primary link 406 can comprise other types of links such as a terrestrial link. It should be noted that hybrid app 450, HU overlay module 466, and CN overlay module 468 are working together to establishing alternative links for enhancing overall network performance.

Referring back to FIG. 4, the network system employs a core node 410, which can provide a communications or other service (e.g, ISP) to home unit 402 via a primary link 406 (e.g., a satellite link). Multiple user devices (e.g., a laptop, smart TV, etc.) 420-426 are connected to home unit 402 via wireless connection(s). It should be noted that before establishing a secondary link, the initial link between home unit 402 and core node 410 is the primary link. The routing control at core node 410 and home unit 402 are configured to send all transmissions over the primary link and/or one or more other alternate links (not shown). A mobile cellular device 408 (e.g., a "smart phone") with a cell plan that includes Internet service is moved into proximity of home unit 402.

Figure 5:
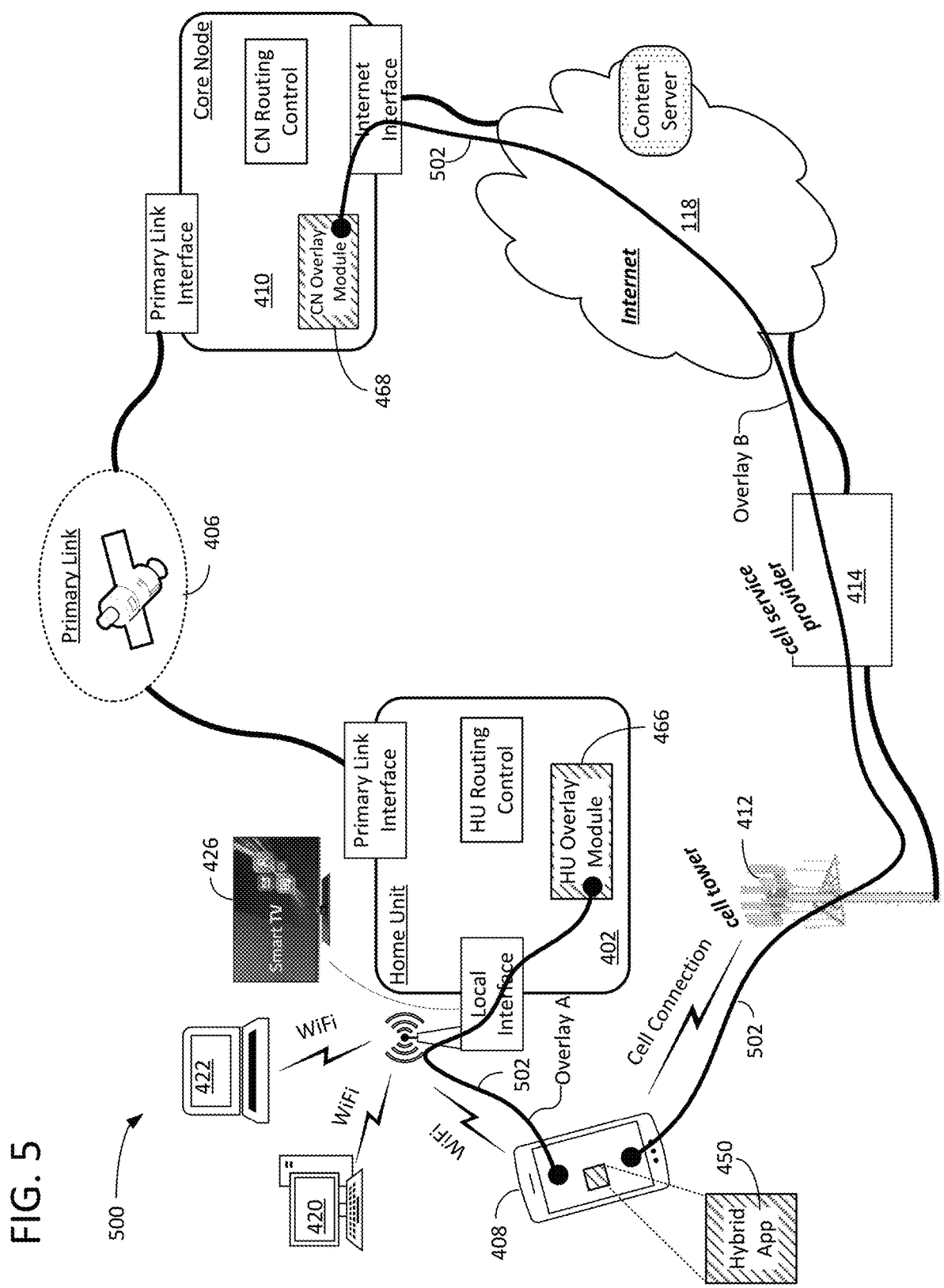

FIG. 5 is a block diagram 500 illustrating an exemplary process of creating a secondary link using an overlay network via a cellular device in accordance with some embodiments of the present invention. Diagram 500 includes home unit 402, cellular device 408, core node 410, Internet 118, and cell tower 412. Diagram 500 is similar to diagram 400 shown in FIG. 4 except that diagram 500 illustrates a secondary link 502 containing overlay network A and overlay network B. Secondary link 502 uses wireless, cellular, Internet connections to connect HU 402 with hybrid app 450 and CN 410. It should be noted that the underlying concept of the exemplary embodiment(s) of the present invention would not change if one or more blocks (or devices) were added to or removed from diagram 500.

In operation, as cellular device 408 is brought into proximity or vicinity (e.g., by wireless connection and/or WiFi) to home unit 402, cellular device 408 (e.g., app 450) sets up a first overlay (A) connection with home unit 402 and a second overlay (B) connection through cell service provider 414 to core node 410 as shown creating secondary link 502. In one aspect, the overlay connections A and B form a secondary link 502 between home unit 402 and core node 410 which results in a hybrid network.

In some embodiments, the routing controllers in core node 410 and home unit 402 can be configured to route selectively network traffic over one of the primary link and the secondary link which is facilitated through the cellular device. It should be noted that the overlays can be VPN (virtual private network) connections or tunnels that operate in accordance with a protocol such as VxLAN (virtual extensible local-area network) or GRE (generic routing encapsulation). Notably, not only the cellular device 408 itself but any other user device (e.g., devices 420-426) connected to home unit 402 can utilize secondary link 502. It is noted that the cellular device 408, in addition to providing the secondary link 502 as discussed above, can function as a user device generally the same as another other user device (e.g., devices 420-426) connected to the HU 402.

Figure 6:
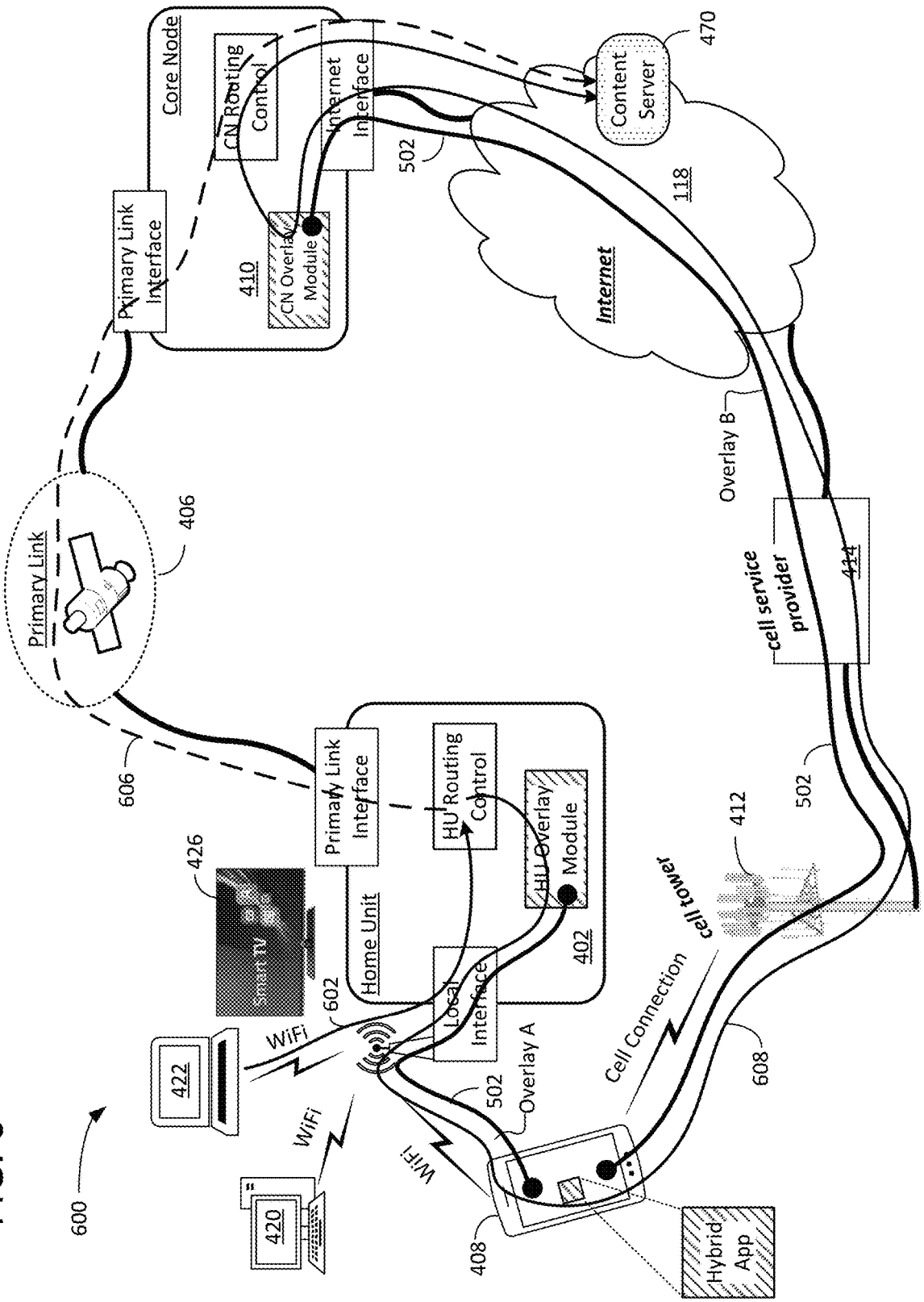
FIGS. 6-7 are block diagrams illustrating an exemplary process of returning network traffic via alternative links in accordance with some embodiments of the present invention.

FIG. 6 is a block diagram 600 illustrating an exemplary process of routing network traffic via alternative links in accordance with some embodiments of the present invention. Diagram 600 includes home unit 402, cellular device 408, core node 410, Internet 118, and cell tower 412. Diagram 600 is similar to diagram 500 shown in FIG. 5 except that diagram 600 illustrates a process of return link network traffic from a device such as user equipment or device 422. It should be noted that the underlying concept of the exemplary embodiment(s) of the present invention would not change if one or more blocks (or devices) were added to or removed from diagram 600.

In operation, when one of the user devices (e.g., 422) has network traffic to send to a content server 470 or other entity on a network such as the Internet 118, routing control in home unit 402 selects the primary link 406 or the secondary link 502. For example, the routing control can match the type of network traffic to the characteristics of the primary link or the secondary link. If routing control selects the primary link 406, it sends 606 the network traffic over the primary link 406 to the core node 410. If routing control in home unit 402 selects the secondary link 502, it sends 608 the network traffic over overlay A to the cellular device 408, which then sends the network traffic over overly B to the core node 410. As noted, overlay B can traverse multiple connections such as a cell connection of the cellular device 408 to a cell tower 412, equipment of a cell service provider 414, and or the Internet 118 or other communications networks. The following describes a non-limiting example of the foregoing.

In this example, user device 422 sends network traffic to a content server 470 on the Internet 118. User device 422 provides data packets of the network traffic addressed to content server 470 through the local interface of the home unit 402, where HU routing control determines whether to send the packets over the primary link 406 or the secondary link 502. If HU routing control determines to send the data packets over the secondary link 502, an HU overlay module in the HU 402 and the hybrid app on cellular device 408 can use tunneling or data encapsulation techniques to route the packets over overlay A and overlay B to core node 410.

In some embodiments, multiple layers of overlays can be used. For example, the HU overlay module in HU 402 can effect an inner encapsulation of the packets for transport to the core node 410, which effectively creates an inner overlay (not shown) from the HU 402 to the core node 410. The HU overlay module can then effect a first outer encapsulation of the packets for transport over overlay A to the cellular device 408, which can de-capsulate the first outer encapsulation. The cellular device 408 can then effect a second outer encapsulation of the packets for transport over overlay B to the core node 410, which can de-capsulate the second outer and the inner encapsulations. The core node 410 can then forward the packets to their original destination, which in this example is content server 470.

Figure 7:
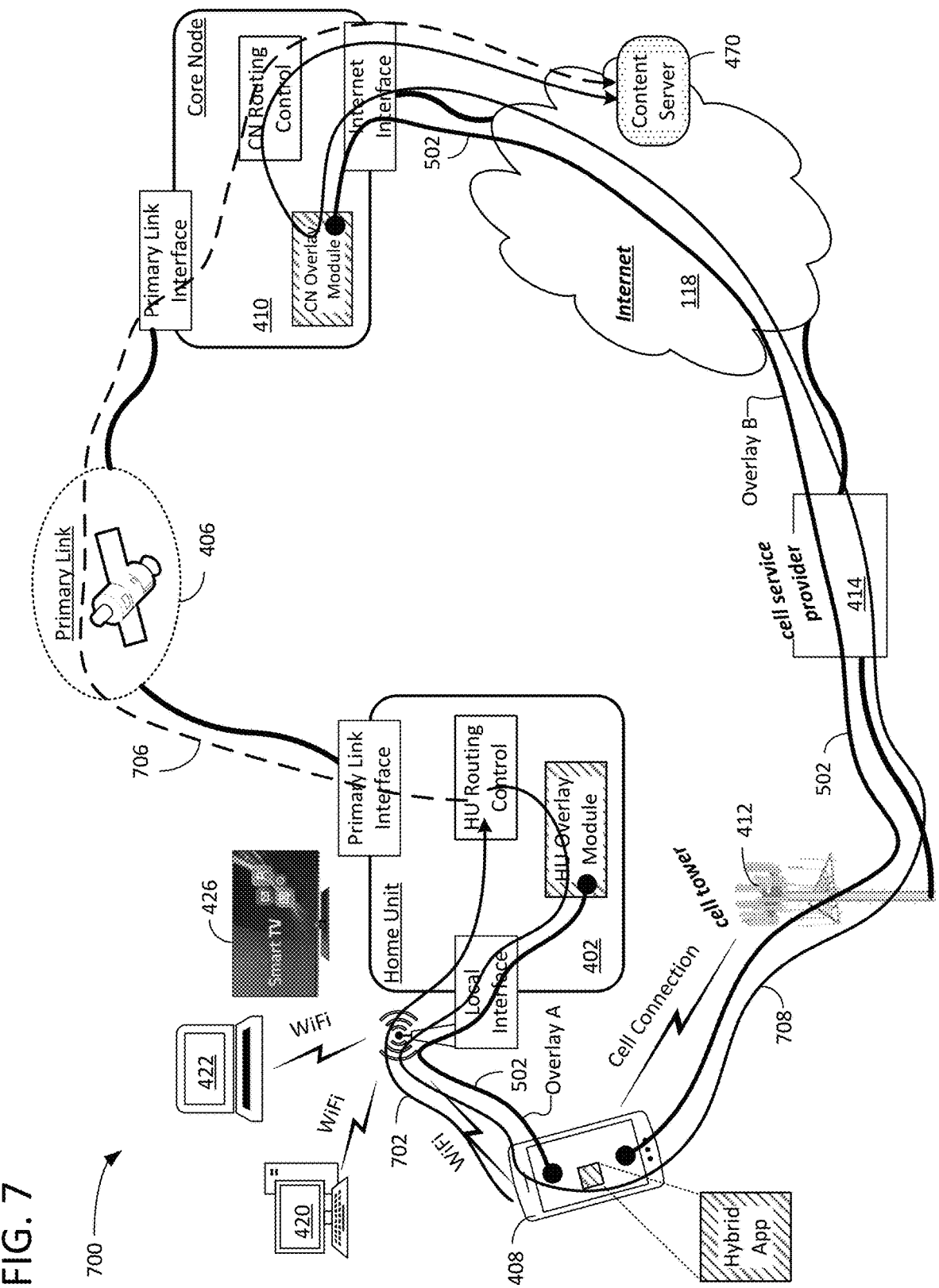

FIG. 7 is a block diagram 700 illustrating an exemplary process of routing network traffic via alternative links in accordance with some embodiments of the present invention. The example illustrated in FIG. 7 is similar to the example of FIG. 6 except that the network traffic originates from the cellular device 408 as a user device rather than user device 422. Diagram 700 includes home unit 402, cellular device 408, core node 410, Internet 118, and cell tower 412.

As noted, the cellular device 408 can function as a user device. As with any of the user devices 420-426, when cellular device 408 has network traffic to send to a content server 470 or other entity on a network such as the Internet 118, routing control in home unit 402 selects the primary link 406 or the secondary link 502. As noted above, routing control can match the type of network traffic to the characteristics of the primary link or the secondary link In the example shown in FIG. 7, cellular device 408 sends network traffic to content server 470 on the Internet 118. Cellular device 408 provides data packets of the network traffic addressed to content server 470 through the local interface of the home unit 402, where HU routing control determines whether to send the packets over the primary link 406 or the secondary link 502. If HU routing control selects the primary link 406, it sends 706 the packets over the primary link 406 to the core node 410. If HU routing control determines to send 708 the data packets over the secondary link 502, the HU overlay module in the HU 402 and the hybrid app on cellular device 408 can use tunneling or data encapsulation techniques to route the packets over overlay A and overlay B to core node 410, for example, in any manner described above.

For example, continuing with the example above of multiple overlays, the HU overlay module in the HU 402 can effect an inner encapsulation of the packets with the core node 410 as the destination of the inner encapsulation. As noted, this effectively creates an inner overlay (not shown) from the home unit 402 to the core node 410. The HU overlay module can then effect a first outer encapsulation of the packets for transport over overlay A back to the cellular device 408, which can de-capsulate the first outer encapsulation. The cellular device 408 can then effect a second outer encapsulation of the packets for transport over overlay B to the core node 410, which can de-capsulate the second outer and the inner encapsulations. The core node 410 can then forward the packets to their original destination, which in this example is content server 470.

Figure 8:
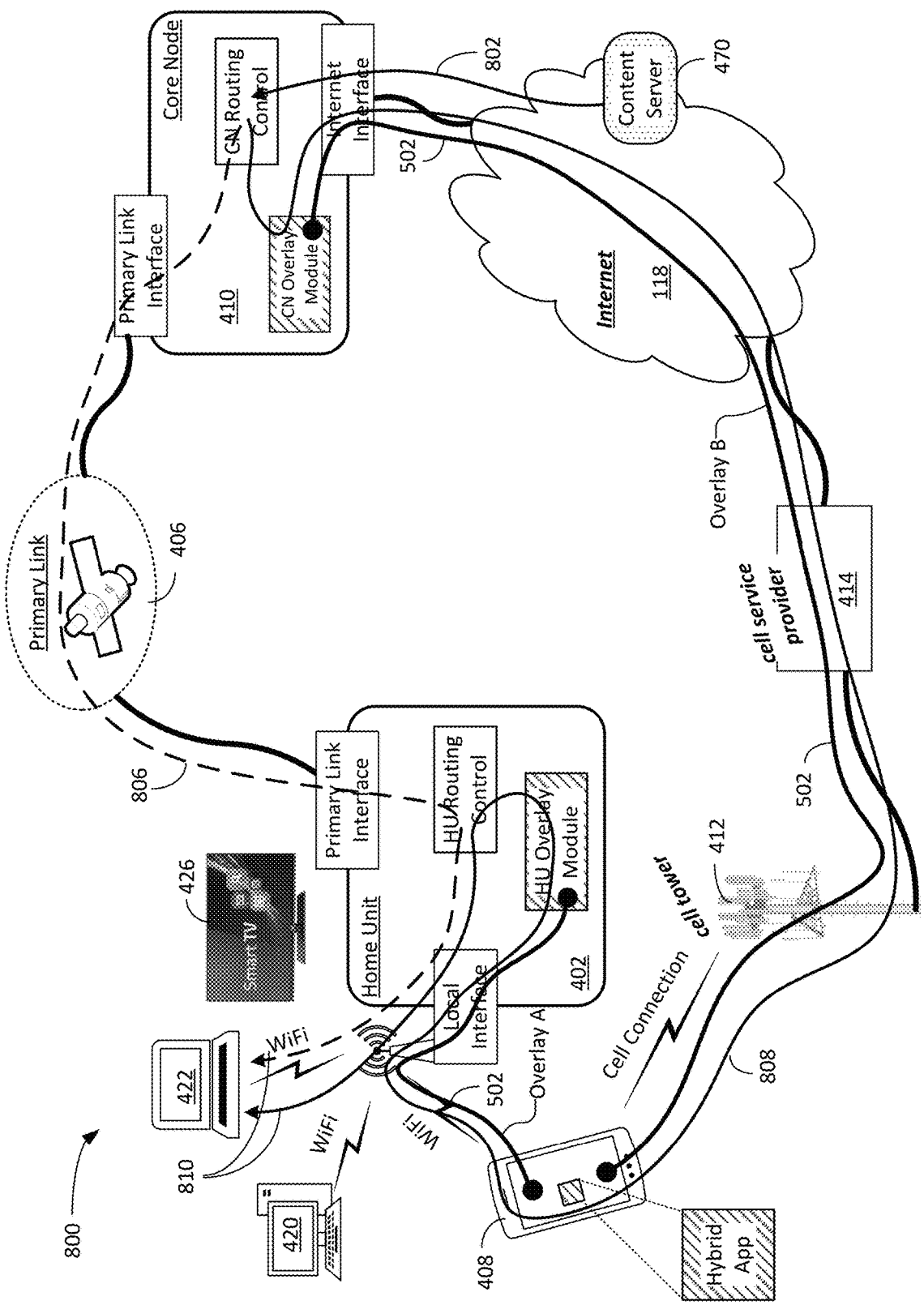
FIGS. 8-9 are block diagrams illustrating an exemplary process of forwarding network traffic via alternative links in accordance with some embodiments of the present invention.

FIG. 8 is a block diagram illustrating an exemplary process of routing network traffic originating from, e.g., the Internet 118, and addressed to a user device (e.g., any of user devices 420-426 or cellular device 408) via alternative links in accordance with some embodiments of the present invention. Diagram 800 includes home unit 402, cellular device 408, core node 410, Internet 118, and cell tower 412. Diagram 800 is similar to diagram 600 shown in FIG. 6 except that diagram 800 illustrates a process of sending forward link network traffic originating from content server 470 to a user device such as devices 420-426 or the cellular device 408. For example, if the network traffic 802 sent by content server 470 is time sensitive, CN routing control at core node 410 may select secondary link 502 assuming that secondary link 502 offers faster transmission speed than primary link 406. It should be noted that time sensitive data may include data related to interactive video games, live conference calls, real-time control, and the like. Alternatively, the CN routing control at core node 410 selects primary link 406. In some embodiments, primary link 406 is selected if the data sent by content server 470 is not time sensitive and the primary link 406 is generally slower than secondary link 502. Regardless of whether the data was sent over the primary link 806 or the secondary link 808, upon reaching the HU routing control of home unit 402, the data is forwarded to the destination user device (user device 422 in the example illustrated in FIG. 8) via wireless connection 810.

In the example illustrated in FIG. 8, content server 470 sends 802 network traffic to user device 422. Core node 410 receives from the content server 470 data packets of the traffic addressed to user device 422. CN routing control in the core node 410 determines whether to send the packets over the primary link 406 or the secondary link 806. If CN routing control selects the former, the packets are forwarded 806 across the primary link 406. If CN routing control, however, selects the secondary link 502, it sends 808 the traffic over overlay B to the cellular device 408, which then sends the traffic over overlay A to the HU 402.

Generally as discussed above, multiple layers of overlays can be used. For example, the CN overlay module in the core node 410 can effect an inner encapsulation of the packets of the traffic for transport to the home unit 402. The CN overlay module can also effect a first outer encapsulation of the packets for transport over overlay B to the cellular device 408, which can de-capsulate the first outer encapsulation. The cellular device 408 can then effect a second outer encapsulation of the packets for transport over overlay A to the home unit 402, which can de-capsulate the second outer and the inner encapsulations. The home unit 402 can then forward the packets to their original destination, which in this example is user device 422.

Figure 9:
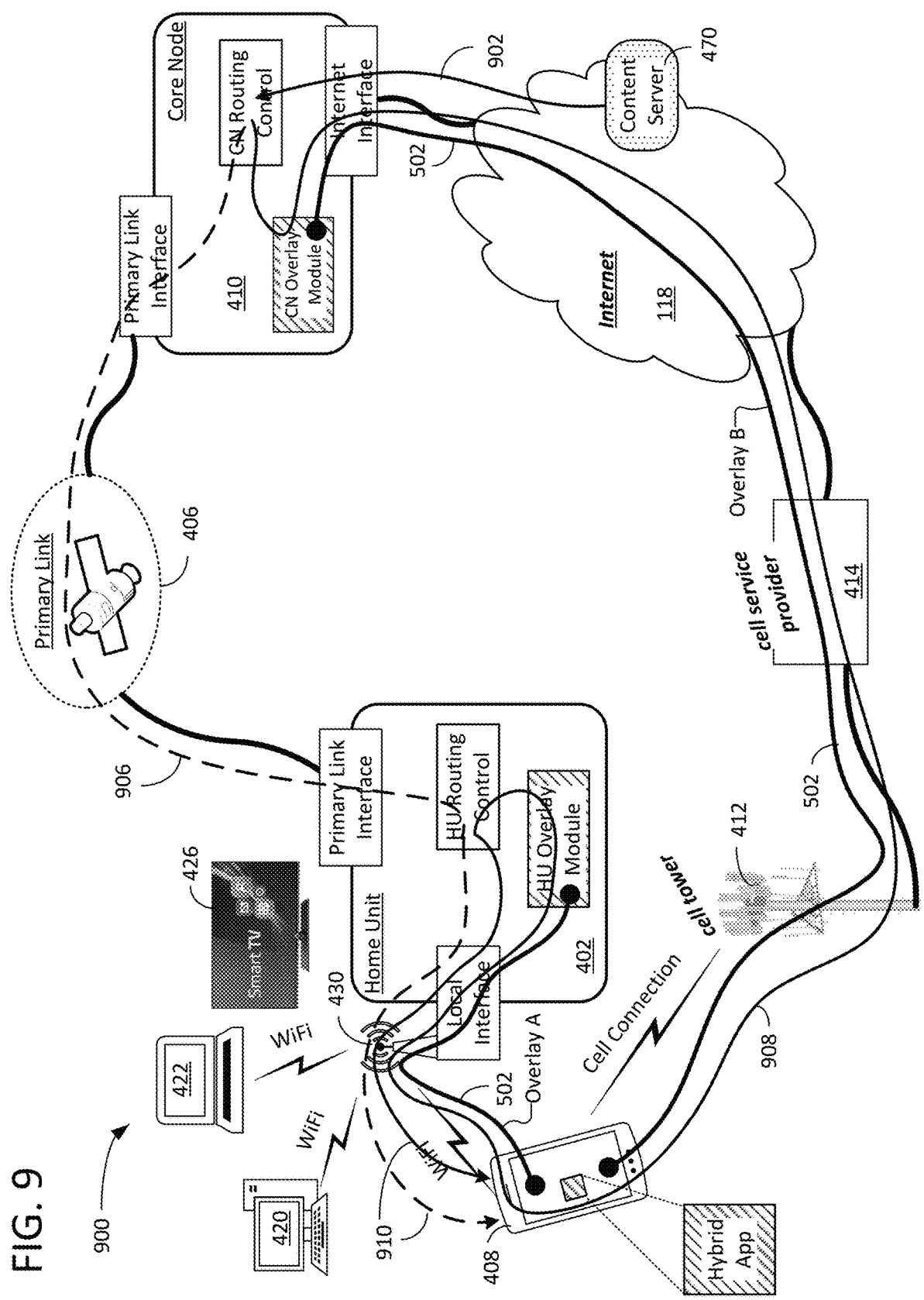

FIG. 9 is similar to the example of FIG. 8 except that the network traffic is destined for the cellular device 408 as a user device rather than user device 422. Diagram 900 includes home unit 402, cellular device 408, core node 410, Internet 118, and cell tower 412. As shown, content server 470 originates network traffic destined for cellular device 408 as the user device. Upon receiving packets of the network traffic, CN routing control of core node 410 determines whether to send the packets over the primary link 406 the secondary link 502. If CN routing control selects the primary link 406, it sends 906 the packets over the primary link 406 to the home unit 402. If, however, CN routing control selects the secondary link 502, the traffic can be sent 908 over the secondary link 502 comprising overlay B and overlay A to the HU 402. The HU 402 can then forward the traffic over the local interface to the destination user device, which in this case is the cellular device 408.

Generally as discussed above with respect to FIG. 8, multiple layers of overlays can be used. For example, the CN overlay module in the core node 410 can effect an inner encapsulation of the packets for transport to the home unit 402. This effectively creates an overlay (not shown) from the core node 410 to the home unit 402. The CN overlay module can then also effect a first outer encapsulation of the packets for transport over overlay B to the cellular device 408, which can de-capsulate the first outer encapsulation. The cellular device 408 can then effect a second outer encapsulation of the packets for transport over overlay A to the home unit 402, which can de-capsulate the second outer and the inner encapsulations. The home unit 402 can then forward the packets to their original destination, which in this example is the cellular device 408 as a user device of home unit 402.

In one aspect, a cellular device such as a smart phone is used to establish a secondary connection or link using multiple overlays or overlay networks. For example, the first overlay is established between home unit 402 and cellular device 408 while the second overlay is created between cellular device 408 and core node 410. A function of cellular device 408 can be to be a "man-in-the-middle" as a wireless client.

An advantage of using a cellular device with a hybrid module is to configure the cellular device as part of secondary link 908 to enhance network performance.

Another advantage of using a hybrid module is that it automatically sets up and employs the secondary link in response to a cellular device connecting to the home unit. It should be noted that the secondary link can be taken down by the hybrid module(s) for channel reconfiguration when the cellular device such as cellular device 408 is disconnected from home unit 402. For example, cellular device 408 moves out of wireless zone or coverage facilitated by local interface 430.

Exemplary aspects of the present invention include various processing steps, which will be described below. The steps may be embodied in machine, router, or computer executable instructions. The instructions can be used to create a general purpose or special purpose system, which is programmed with the instructions, to perform the steps of the exemplary aspects of the present invention. Alternatively, the steps may be performed by specific hardware components that contain hard-wired logic for performing the steps, or by any combination of programmed computer components and custom hardware components.

Figure 10:
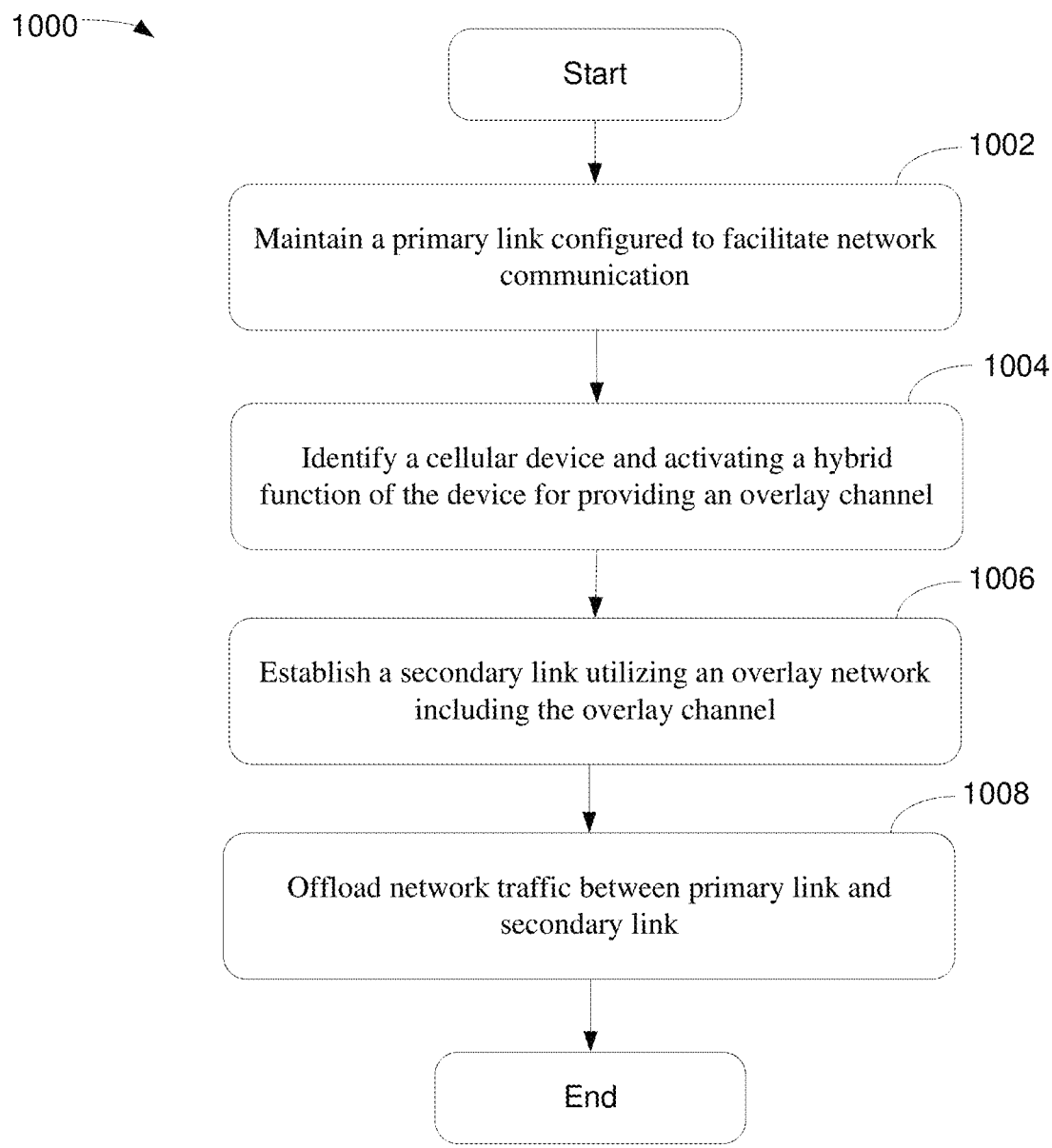
FIG. 10 is a flowchart illustrating an exemplary process of establishing an alternative link using a cellular device as a wireless client in accordance with some embodiments of the present invention.

FIG. 10 is a flowchart 1000 illustrating an exemplary process of establishing an alternative link using a cellular device as a wireless client in accordance with some embodiments of the present invention. The process illustrated by flowchart 1000 can be performed on any of the systems illustrated in FIGS. 1A-9.

At block 1002, a process capable of providing alternative communication channels for facilitating network communication maintains a primary link configured to facilitate network communication between attached devices and multiple content providers. For example, the network traffic is transported via a communications network containing a satellite communication network. Primary link 406 in FIGS. 4-9 is a non-limiting example. Examples of ways in which block 1002 can be performed include any of the examples discussed above with respect to FIGS. 4-9.

At block 1004, upon identifying a CWC device, a hybrid function of the CWC device is activated for providing an overlay channel between a cellular transceiver and a wireless transceiver of the CWC device. In one example, the process continuously monitors and surveys nearby cellular phones for potential wireless clients. After verifying the presence of a hybrid module in the cellular phone, the cellular device is configured to be a wireless client capable of establishing an overlay network or channel for facilitating a secondary link.

At block 1006, the process is capable of establishing a secondary link utilizing an overlay network including the overlay channel. For example, the process is able to create a wireless communication channel, overlay channel, cellular channel, and Internet as at least a portion of the secondary link. Secondary link 502 in FIGS. 4-9 is a non-limiting example. Examples of ways in which block 1006 can be performed include any of the examples discussed above with respect to FIGS. 4-9.

At block 1008, the network traffic can be offloaded between the primary link and the secondary link. In some embodiments, the network traffic is transmitted via the secondary link in accordance with characteristic of the network traffic. For example, an interactive video conference or video game is more time sensitive than a data backup or playing media such as a video from a provider such as YouTube®. In some embodiments, the cellular transceiver of the CDC device receives a data stream from a cellular connection and subsequently transmits the data stream to the network routing element via a wireless connection. The process is further capable of identifying a smart phone and activating a hybrid function of the smart phone for providing a second overlay channel between a cellular transceiver and a wireless transceiver of the smart phone. After establishing a new link utilizing overlay networks, the network traffic is offloaded from the primary link to the new link via the smart phone as a wireless client. Non-limiting examples of ways in which block 1008 can be performed include any of the examples illustrated and discussed above with respect to FIGS. 6-9.

Figure 11:
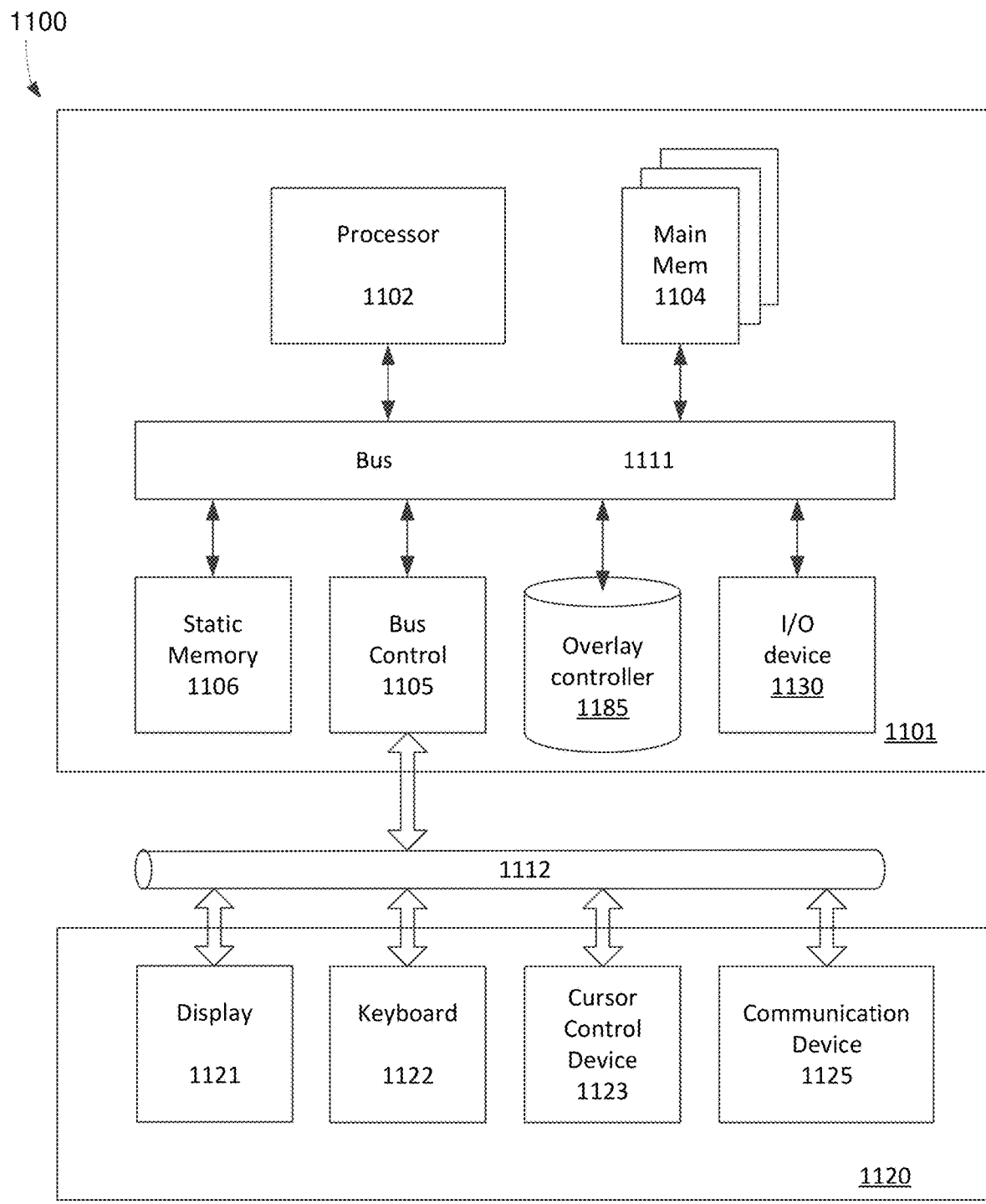
FIG. 11 is a block diagram illustrating an exemplary computer system, host machine, router, home unit, node, or base station capable of providing and facilitating an overlay network in accordance with some embodiments of the present invention.

FIG. 11 is a block diagram 1100 illustrating an exemplary computer system, host machine, router, home unit, node, or base station capable of providing and facilitating an overlay network in accordance with some embodiments of the present invention. To simplify forgoing discussion, the term "system" is used to refer to terms as computer system, host, host machine, VM, NIC, switching module(s), and the like. System 1100, for example, includes a processing unit 1101, interface bus 1111, and I/O unit 1120. Processing unit 1101 includes a processor 1102, main memory 1104, system bus 1111, static memory device 1106, bus control unit 1105, and overlay controller 1185 for facilitating overlay operations. It should be noted that the underlying concept of the exemplary embodiment(s) of the present invention would not change if one or more blocks (circuit or elements) were added to or removed from diagram 1100.

Bus 1111 is used to transmit information between various components and processor 1102 for data processing. Processor 1102 may be any one of a wide variety of general-purpose processors, embedded processors, or microprocessors, such as ARM® embedded processors, Intel® Core™ Duo, Core™ Quad, Xeon®, Pentium™ microprocessor, Motorola™ 68040, AMD® family processors, or Power PC™ microprocessor. A function of processor 1102 is able to execute instructions based on instruction sets stored in memory 1104.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Bus control unit 1105 manages the communications between bus 1111 and bus 1112. Mass storage memory 1106, which may be a magnetic disk, optical disk, hard disk drive, floppy disk, CD-ROM, solid state drive ("SSD"), and/or flash memories, are used for storing large amounts of data.

I/O unit 1120, in one example, includes a display 1121, keyboard 1122, cursor control device 1123, and communication device 1125. Display device 1121 may be a liquid crystal device, cathode ray tube ("CRT"), touch-screen display, or other suitable display device. Keyboard 1122 may be a conventional alphanumeric input device for communicating information between computer system 1100 and computer operator(s). Another type of user input device is cursor control device 1123, such as a conventional mouse, touch mouse, trackball, or other type of cursor for communicating information between system 1100 and user(s).

Communication device 1125 is coupled to bus 1111 for accessing information from remote computers or servers through a wide-area communication network. Communication device 1125 may include a modem, network interface device, and/or other similar devices that facilitate communication between computer 1100 and external network or devices.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for providing alternative communication channels for facilitating network communication, comprising:

maintaining, by a network routing element, a primary link configured to facilitate network communication between a plurality of attached devices and a content server;

identifying a cellular and wireless capable ("CWC") device and activating a hybrid function of the CWC device for providing an overlay channel between a cellular transceiver and a wireless transceiver of the CWC device, wherein the wireless transceiver is different from the cellular transceiver;

establishing, by the network routing element, a secondary link utilizing an overlay network including the overlay channel;

receiving, by the network routing element, data packets of network traffic originating from the CWC device, wherein the data packets are addressed to the content server; and offloading network traffic between the primary link and the secondary link by deciding to send the data packets, originating from the CWC device and addressed to the content server, over the secondary link.

2. The method of claim 1, wherein maintaining by a network routing element a primary link includes transporting network traffic via a communications network comprising a satellite link.

3. The method of claim 1, wherein identifying a cellular and wireless capable ("CWC") device includes recognizing a nearby cellular device.

4. The method of claim 3, wherein recognizing a nearby cellular device includes verifying presence of a hybrid module in the nearby cellular device.

5. The method of claim 1, wherein activating a hybrid function of the CWC device includes obtaining a confirmation of being a wireless client from the CWC device.

6. The method of claim 1, wherein establishing by the network routing element a secondary link includes facilitating to create a wireless communication channel, overlay channel, and cellular channel.

7. The method of claim 1, wherein offloading network traffic includes transmitting network traffic via the secondary link in accordance with characteristic of the network traffic.

8. The method of claim 1, wherein offloading network traffic includes receiving by the cellular transceiver of the CWC device a data stream from a cellular connection and transmitting the data stream to the network routing element via a wireless connection.

9. The method of claim 1, further comprising:
identifying a smart phone and activating a hybrid function of the smart phone for providing a second overlay channel between a cellular transceiver and a wireless transceiver of the smart phone;
establishing by the network routing element a new link utilizing a second overlay network including the second overlay channel; and
offloading network traffic between the primary link and the new link via the smart phone.

10. A network system configured to provide alternative communication links for facilitating network communication, comprising:
a primary link configured to facilitate network communication between a primary link interface of a network device and a core node;
a cellular and wireless capable ("CWC") device coupled to the network device and configured to have a wireless transceiver and a cellular transceiver, wherein the wireless transceiver is different from the cellular transceiver, wherein the CWC device includes a hybrid module capable of providing a function of wireless client; and
a secondary link coupled to the network device and configured to include a wireless connection between the network device and the CWC device, an overlay channel between the wireless transceiver and the cellular transceiver of the CWC device, and a cellular connection between the CWC device and Internet,
wherein the CWC device is configured to transmit to the network device data packets of network traffic originating from the CWC device, wherein the data packets are addressed to a content server, and
wherein the network device is configured to offload network traffic between the primary link and the secondary link by deciding to send the data packets, originating from the CWC device and addressed to the content server, over the secondary link.

11. The network system of claim 10, wherein the primary link includes a satellite communication network.

12. The network system of claim 10,
wherein the network device is a router; and
wherein the core node includes a communication network overlay module operable to couple to the secondary link.

13. The network system of claim 10, the secondary link includes one or more cell towers for data transmission.

14. The network system of claim 10, the secondary link includes land lines.

15. The network system of claim 10, the primary link and the secondary link are coupled to Internet.

16. A method for providing alternative communication channels, comprising:
establishing a wireless connection between an overlay module of a home unit and a wireless transceiver of a cellular phone;
building a transmission channel between the wireless transceiver of the cellular phone and a cellular transceiver of the cellular phone for transporting network traffic when the cellular phone is configured to be a wireless client;
maintaining by the home unit a primary link for facilitating network communication between the home unit and a core node;
creating a cellular connection between the cellular transceiver of the cellular phone to a cell tower for transmitting network traffic;
providing an overlay network as a secondary link between the home unit and the core node via Internet;
receiving, by the home unit, data packets of network traffic originating from the cellular phone, wherein the data packets are addressed to a content server; and
offloading network traffic between the primary link and the secondary link by deciding to send the data packets, originating from the cellular phone and addressed to the content server, over the secondary link.

17. The method of claim 16, wherein offloading network traffic includes transmitting network traffic via the secondary link in accordance with characteristics of the network traffic.

18. The method of claim 16, wherein the primary link includes a satellite communication network.

* * * * *